Patented Nov. 21, 1933

1,935,692

UNITED STATES PATENT OFFICE 1,935,692

PROCESS FOR PREPARING VULCANIZED FIBER

Ernst Becker and Karl Letters, Duneberg, Germany, assignors to I. G. Farbenindustrie Aktiengesellschaft, Frankfort - on - the - Main, Germany No Drawing. Application September 22, 1930, Serial No. 483,750, and in Germany September 23, 1929

6 Claims. (Cl. 8—20)

The present invention relates to the manufacture of vulcanized fiber.

In the manufacture of vulcanized fiber by means of zinc chloride solution it is desirable to predetermine the specific gravity of the finished product and to manufacture light or heavy fiber according to the intended purpose of application.

In accordance with our invention vulcanized fiber of either type can be manufactured from paper by working with a zinc chloride lye that is an aqueous zinc chloride solution containing about 70.5% by weight of zinc chloride to which a small amount of a suitable salt soluble in said zinc chloride lye has been added. As salts coming into consideration for the purpose of the invention there may be enumerated by way of example the alkali metal and alkaline earth metal chlorides, ammonium chloride, the alkali metal and ammonium sulfates. The quantities of the salts and their specific kind added to the zinc chloride solution are adapted to the desired specific gravity of the finished product, but care must be taken that the concentration of the salts is not too high because thereby the adherence of the individual layers is prejudiced. Thus, in using the alkaline earth metal chlorides, the upper limit is about a 2% concentration, while the alkali metal-and ammonium chlorides may be used in somewhat higher concentration, say up to about 3%. The temperatures at which the process is carried out may range between about 40 and 75° C. Thus, whereas pure lyes produce light fiber from papers suitable for this purpose, lyes to which small amounts of salts have added yield heavier fibers. Sodium chloride exerts a less effect in this respect than, for example, ammonium chloride and the latter again still much less than calcium chloride. The latter possesses a particularly pronounced effect and by the addition of varying quantities of calcium chloride any desired degree of specific gravity or of parchmentizing can be attained.

The invention is illustrated by the following examples, without being limited thereto:

*Example 1.*—The manufacture of a specifically heavy, very horn-like fiber is carried out by means of a zinc chloride lye containing 70% by weight of zinc chloride and 1.5% by weight of calcium chloride. The specific gravity of the lye is 1.975 at a temperature of 20° C. and the temperature of working, is for example, 60° C. In this manner a very horn-like, easily workable vulcanized fiber is produced of a specific gravity exceeding 1.4.

*Example 2.*—From a porous and absorbent paper a vulcanized fiber is produced by means of a zinc chloride lye containing 71% by weight of zinc chloride and 0.6% by weight of calcium chloride. The specific gravity of the lye is 1.980 at a temperature of 20° C. and the working is effected at a temperature of 60° C. The specific gravity of the fiber produced is 1.25–1.35, it is tough and can be easily punched.

*Example 3.*—From a porous and absorbent raw material a vulcanized fiber is produced by means of a zinc chloride lye containing 70.5% by weight of zinc chloride and 3% by weight of ammonium chloride. The specific gravity of the lye is 1.975 at a temperature of 20° C. and the working is effected at about 55° C. A light and flexible fiber is obtained, possessing a specific gravity of about 1.2.

It will, of course, be understood that any variations of the zinc chloride lye and of the paper or machines employed will exert an important influence on the properties of the vulcanized fiber produced.

We claim:

1. Process for the manufacture of vulcanized fiber which comprises parchmentizing paper by means of a zinc chloride lye containing up to about 3% of a salt selected from the group consisting of ammonium-, alkali metal- and alkaline earth metal chlorides.

2. Process for the manufacture of vulcanized fiber which comprises parchmentizing paper by means of a zinc chloride lye containing up to about 3% of a salt selected from the group consisting of ammonium-, alkali metal- and alkaline earth metal chlorides, at a temperature between 40–75° C.

3. Process for the manufacture of vulcanized fiber which comprises parchmentizing paper by means of a zinc chloride lye containing at most 2% of calcium chloride.

4. Process for the manufacture of vulcanized fiber which comprises parchmentizing paper by means of a zinc chloride lye containing at most 2% of calcium chloride at a temperature between 40–75° C.

5. Process for the manufacture of vulcanized fiber which comprises parchmentizing paper by means of a zinc chloride lye containing 70% of zinc chloride and 1.5% of calcium chloride at a temperature of 60° C.

6. Process for the manufacture of vulcanized fiber which comprises parchmentizing paper by means of a zinc chloride lye containing 71% of zinc chloride and 0.6% of calcium chloride at a temperature of 60° C.

ERNST BECKER.
KARL LETTERS.